United States Patent [19]
Bateman et al.

[11] 3,758,211
[45] Sept. 11, 1973

[54] ATMOSPHERIC VISIBILITY MEASURING APPARATUS

[75] Inventors: Douglas Alfred Bateman, Berkshire, Crowthorne; Geoffrey John Burrell, Hampshire, Fleet; Donald Edward Killick, Surrey, Camberley, all of England

[73] Assignee: The Secretary of State for Defence in Her Britannic Majesty's Government of the United Kingdom of Great Britain and Northern Ireland, London, England

[22] Filed: Jan. 13, 1972

[21] Appl. No.: 217,596

[52] U.S. Cl. ............... 356/103, 250/235, 356/209
[51] Int. Cl. .............. G01n 21/00, G01n 21/48
[58] Field of Search ................ 356/103, 102, 104, 356/209, 212; 350/6, 7; 250/235, 236

[56] References Cited
UNITED STATES PATENTS

| | | | |
|---|---|---|---|
| 3,640,626 | 2/1972 | Liskowitz | 356/103 |
| 3,092,687 | 6/1963 | Cannon, Jr. | 350/7 |
| 3,519,354 | 7/1970 | Brown, Jr. et al. | 356/103 |
| 3,668,674 | 6/1972 | Westendorf | 356/103 |
| 3,146,293 | 8/1964 | Lesage | 250/218 |
| 3,510,225 | 5/1970 | Collis | 356/103 |

*Primary Examiner*—Ronald L. Wibert
*Assistant Examiner*—V. P. McGraw
*Attorney*—Gordon W. Daisley

[57] ABSTRACT

The apparatus comprises a light projection means for projecting a beam of light into the atmosphere along a prescribed beam path, an optical detection means arranged to respond to light scattered by particles in the atmosphere from within another beam path surrounding an optical axis of the detector, and control apparatus for turning the light beam and the optical axis of the detection means in unison about a horizontal axis which extends substantially from the projection means to the detection means. The light projection means and the optical detection means are relatively mounted so that the optical axis of the detection means always intersects the light beam at a constant angle and at a constant range from the detection means. The control apparatus may comprise a rotatable horizontal shaft supporting the light projection means and the optical detection means. Alternatively a fixed light projector and detector may be arranged to co-operate with two mirrors provided on a rotatable horizontal shaft the mirrors being arranged to direct the light beam into the prescribed beam path and to reflect the scattered light onto the detector. The projection means and the detection means, or just the mirrors which form a part thereof, may be mounted separately and maintained in relative alignment by a follow-up servo system.

8 Claims, 5 Drawing Figures

ATMOSPHERIC VISIBILITY MEASURING APPARATUS

BACKGROUND OF THE INVENTION

The present invention relates to instruments for making measurements of atmospheric visibility.

It is important in aircraft operations to have accurate information on degrees of visibility especially in the vicinity of an airfield. Known methods of measuring variations in visibility have certain disadvantages. For example, it is known to measure the visibility of the atmosphere by transmitting a beam of light over a known distance on the ground. The amount of light falling on a detector is then compared with a standard and a measure of the relative visibility is deduced therefrom. However, in still air conditions it is common for air to form layers of widely differing degrees of visibility and hence a measure of the visibility at or near ground level would be widely different from that at some hundreds of feet of altitude. To overcome this drawback it is known to project a beam of light into the atmosphere and then to measure the strength of some of the scattered light which results when the beam passes through layers of fog, mist, rain drops etcetera. The degree of light scattering provides an indication of the condition of the atmosphere and hence a measure of relative visibility, as is described for instance by Lesage in U.S. Pat. No. 3,146,293 or by Brown in U.S. Pat. No. 3,519,354.

The light scattered from regions of the beam is measured by scanning the detector in elevation and noting the detector output at regular intervals. Continuous light may be used, but to eliminate spurious signals it is conventional in the art to project light which is pulsed or periodically interrupted at some convenient rate and to measure the detector output with metering apparatus which measures the amplitude of variations in the light detected occurring at the same rate. The detector is normally located at ground level. This latter method has the disadvantage that the scattered light falling on the detector travels a distance which is different for each angular position of the detector. Thus the strength of the detected light is a function of the angle of scan and this factor complicates the interpretation of the measured values. The measurements or their interpretation are further complicated because the proportion of the light scattered towards the detector depends on the angle between the projected beam and the line of sight to the detector.

It is an object of the present invention to provide an improvement in atmospheric visibility measuring apparatus.

SUMMARY OF THE INVENTION

According to the present invention there is provided apparatus for measuring the visibility conditions of the atmosphere including projection means for projecting a beam of light along a first beam path, detection means responsive to light incident on it from within a second beam path, the projection means and the detection means being relatively mounted so that the first and second beam paths will intersect at a predetermined angle and so that the detection means will receive light scattered from the part of the beam where the two beam paths intersect and which is at a predetermined constant range from the detection means, and including control means for rotating the said two beam paths in unison.

The control means may include a rotatably mounted shaft to which the projection means and detector means are both rigidly mounted, and means for making the said shaft oscillate or turn through a predetermined angle.

Alternatively the detector means and the projection means may be mounted on separate units which are coupled together by a follow-up servo system so that they move in synchronism with each other.

The invention may comprise two mirrors, mounted on opposite ends of a horizontal rotatable shaft at an acute angle to the axis of the shaft, projection means for projecting a beam of light via one mirror, and detection means for detecting scattered light via the other mirror. The projection means may comprise a lamp also mounted on the shaft.

BRIEF DESCRIPTION OF THE DRAWINGS

Embodiments of the invention will now be described by way of example only with reference to FIGS. 1, 2, 3, 4 and 5 the accompanying drawings which are schematic diagrams of different alternative forms of an apparatus for measuring atmospheric visibility. Note that similar parts in all of the drawings bear the same or similar reference characters and perform similar functions.

DESCRIPTION OF THE PREFERRED EMBODIMENTS

Figure 1:
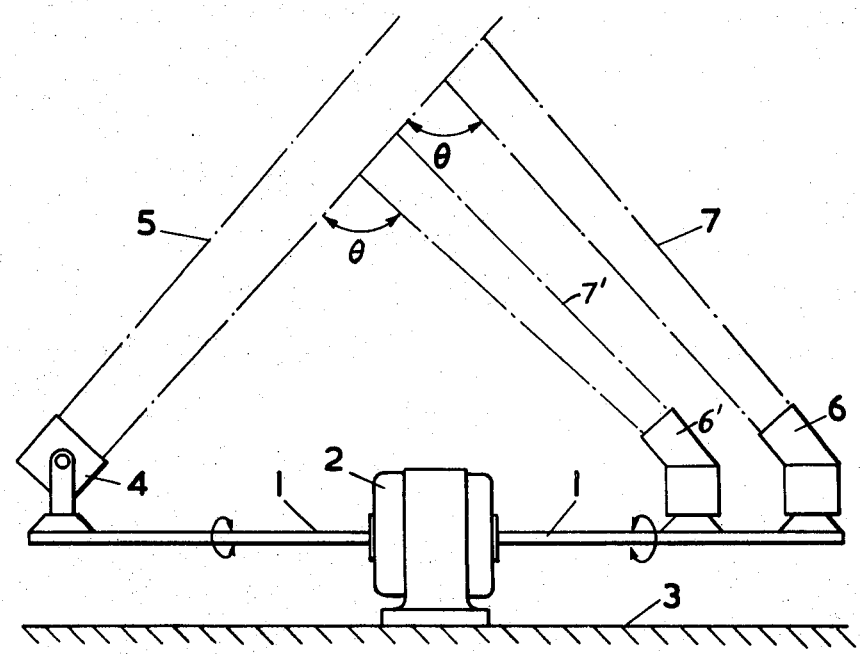

FIG. 1 shows a shaft 1 connected to a drive motor 2 which is supported on a surface 3. A light projector 4 is mounted on one end of the shaft 1 and is arranged to project a beam of light along a beam path which is outlined by the broken lines 5. A light sensitive detector 6 is mounted on the other end of the shaft 1 and is arranged to respond to light arriving substantially along another beam path indicated by the broken lines 7. The detector 6 may be conventional including a telescope with a photocell at its focus, and means for deriving a conveniently measurable signal representing the said light from the photocell current (not shown). Since this is a matter of the application of apparatus and techniques well known in the art, and the precise form of measuring apparatus adopted is immaterial to the operation and benefits of the improvement herein claimed, it does not require any further description or illustration.

The drive motor 2 is arranged to impart an oscillatory motion to the shaft 1 so that it rocks through a predetermined angle. When the shaft 1 oscillates, the beam from the projector 4 sweeps through a path from a nearly horizontal position on one side of the shaft 1 to a vertical position. The optical axis of the detector 6 moves in unison with the beam and intersects the beam path at a constant angle $\theta$. Thus for all angular positions of the shaft 1 the distance to the detector 6 from the point of intersection of the beam with the restricted beam path remains constant.

In operation in conditions of poor visibility the various particles in the atmosphere cause scattering of the light from the beam. Some of the scattered light from a small area of the beam about its point of intersection with the path 7 falls on the detector 6 and produces an electrical output representing the quantity of light received. This output will depend on the attenuation of the light in the paths to and from the intersection as well as on the scattering at the intersection and therefore forms a useful measurement of atmospheric visibility. The angle θ and the lengths of the light paths are constant for all measurements, but the height above the ground of the point of intersection of the beam with the beam path 7 is different for each angular position of the shaft 1. Thus by relating the output of the detector 6 to the angular position of the shaft 1 the variations of visibility with altitude may be deduced.

Figure 2:
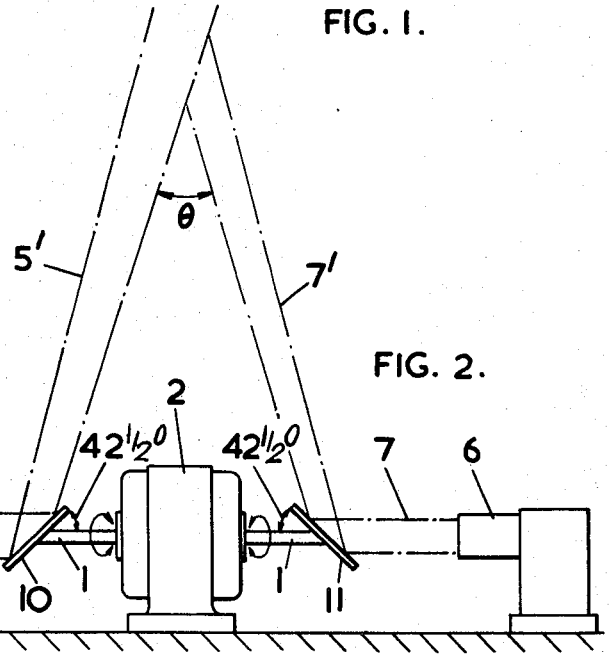

FIG. 2 shows another embodiment of the invention.

In FIG. 2 two mirrors 10 and 11 are mounted on the ends of the shaft 1. The mirrors are arranged to be at an angle of approximately 42½° to the axis of the shafts. The light projector 4 projects a beam on to the mirror 10 which reflects it into the sky at an angle which causes it to intersect the reflected optical axis of the detector 6 at a given altitude. As in the case of the embodiment of FIG. 1 the motor 2 is arranged to impart an oscillatory motion to the shaft 1.

In operation this embodiment is used in a similar fashion to that of the first embodiment already described. The scattered light from the beam is deflected by the mirror 11 and then impinges on the detector 6.

The angle of inclination of the mirrors 10 and 11 and the distance between them is chosen so that the visibility may be measured through any desired range of altitudes.

The proportion of light scattered from a given part of a light beam, in a given direction relative to the direction of the beam, is substantially proportional to fog density, while the attenuation of the beam and the attenuation of the scattered light reduces its intensity according to an exponential function of distance times fog density. The resultant observable affect of these two factors is that the detected light intensity varies as a function of fog density which rises to a peak at a particular value of fog density, and then decreases for denser fogs. This leads to an ambiguity, which may be resolved by comparisons between measurements taken over two different path lengths, or by comparisons between successive measurements of a series with each other and with a ground-level visibility measurement. The possible ambiguity can be ignored in practical measurements over a sufficiently short path length, and such measurements can be used to resolve the ambiguity in measurements over longer paths.

One method of obtaining visibility measurements over different beam path lengths, with the embodiments hereinbefore described with reference to FIG. 1, is to provide a second detector 6' similar to the detector 6, but differently mounted so as to receive the scattered light over a shorter beam path. Alternatively the detector 6 may be constructed so that it is readily adjustable, to receive scattered light from the beam 5 or 5' along different lengths of light path 7 or 7'. In an arrangement of the kind shown in FIG. 2 a second mirror similar to the mirror 11 may be additionally provided and set at a different angle to the shaft 1 so that it reflects scattered light from a different area of the beam path 5'. In that case the detector 6 should be made adjustable so as to receive light from either one of the said mirrors.

Figure 3:
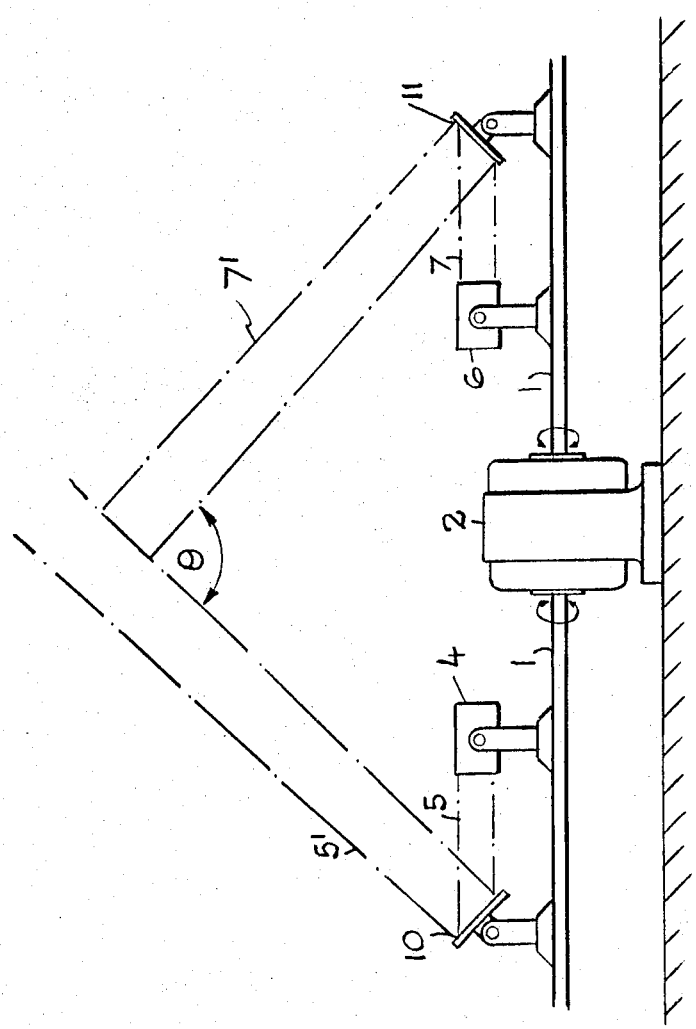

FIG. 3 is an alternative embodiment in which, the lamp 4 and the detector 6 may be mounted on the shaft 1 between the mirrors on opposite sides of the drive motor 2, the mirrors 10 and 11 being arranged to direct the light from the lamp 4 into the beam path 5' and to direct light from the beam path 7' towards the detector 6 respectively. This embodiment avoids the rotation effect which the oscillating mirrors in the arrangement of FIG. 2 produce on the beam which tends to alter the cross section of the beam, and tends to alter the distribution of light on the sensitive area of the detector.

Figure 4:
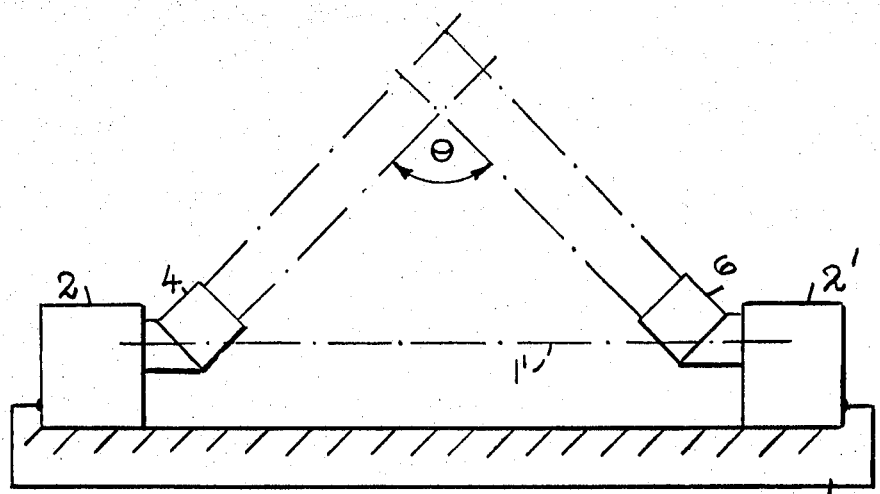
Figure 5:
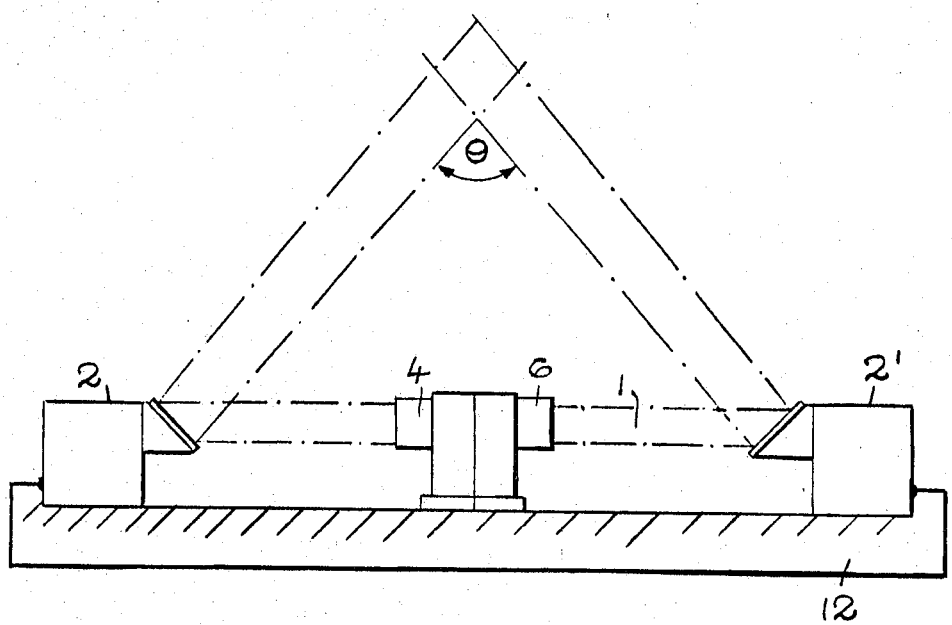

FIGS. 4 and 5 show two alternative embodiments wherein the rotatably mounted parts are mounted on separate units 2 and 2' of a follow-up servo system connected by a control link 12. Obviously one of the units 2 or 2' will be a master unit and another will be a slave unit, it being immaterial which is which, so long as they are arranged to rotate in unison about a common horizontal axis 1'.

The instrument may be calibrated by rotating the beams to a horizontal position and comparing the measurements then made with measurements made along a ground level path by a transmissometer of any conventional type, or with measurements made by the instrument with the beams in a horizontal position and with a reflecting surface placed at their intersection so as to reflect a standard proportion of the beam 5 towards the detector 6. Further measurements may also be made with an adjustment to give a different value of the angle θ. In the embodiment of FIG. 2 the mirrors 10 and 11 can be removed, or made with semi-transparent areas so that for calibration purposes light from the projector 4 can be transmitted through a standard attenuating filter (not shown) to the detector 6.

Instead of oscillating the shaft 1 through just one quadrant as hereinbefore described it may be preferable to oscillate it through 180° and use the measurements from one quadrant to check those of the other; in some embodiments the shaft may be continuously rotated, the output of the detector 6 being ignored or used as a calibration check during the half-turns which direct the beam towards the ground. A motor drive is not essential; a manual system for rotating the shaft 1 as desired could be considered a reasonable alternative.

We claim:

1. Apparatus for measuring the visibility conditions of the atmosphere comprising projection means for projecting a beam of light along a first beam path, detection means capable of providing measurable output signals representing the amount of light incident on the detection means from within a second beam path, wherein the projection means and the detection means are mounted relative to each other so that the first and second beam paths will intersect at a predetermined constant angle and at a predetermined constant range from the detection means, and the detection means will receive light scattered from the part of the beam of light where the two beam paths intersect, and wherein the apparatus also comprises control means for turning the said two beam paths in unison about a substantially horizontal axis extending from the projection means to the detection means.

2. Apparatus as claimed in claim 1 and wherein the control means includes a shaft mounted rotatably such that its longitudinal axis is co-linear with the said substantially horizontal axis and on which the projection means and the detection means are rigidly mounted, and means for turning the said shaft about its longitudinal axis through a predetermined range of angular positions.

3. Apparatus as claimed in claim 1 and wherein the control means comprises a follow-up servo system connected to the projection means and the detection means so as to maintain the relative alignment of the two beam paths when they are turned about the said substantially horizontal axis.

4. Apparatus as claimed in claim 1 where the projection means includes a light projector and a first mirror mounted to direct light from the light projector into the first beam path, wherein the detection means includes a light detector and a second mirror mounted to direct light from the second beam path onto the light detector, and wherein the control means comprises means for turning the first mirror and the second mirror in unison about the said substantially horizontal axis.

5. Apparatus as claimed in claim 4 and wherein the control means comprises a shaft mounted rotatably such that its longitudinal axis is a co-linear extension of the said substantially horizontal axis and means for turning the shaft through a predetermined range of angular positions about its longitudinal axis, and wherein the first and second mirrors are mounted on opposite ends of the shaft.

6. Apparatus as claimed in claim 4 and wherein the mirrors are mounted on separate mountings and the control means comprises a follow-up servo system connected to maintain the relative alignment of the two beam paths when they are turned about the said substantially horizontal axis.

7. Apparatus as claimed in claim 1 wherein the detection means comprises at least one part which is duplicated so as to enable measurements to be made over different path lengths.

8. Apparatus as claimed in claim 1 and also comprising an additional detection means, responsive to light from within a third beam path, and mounted so that the third beam path intersects the first beam path at a constant angle and at a constant range from the additional detector means, and is turned in unison with the first beam path and the second beam path.

* * * * *

UNITED STATES PATENT OFFICE
CERTIFICATE OF CORRECTION

Patent No. 3,758,211         Dated September 11, 1973

Inventor(s) Douglas Alfred Bateman et al.

It is certified that error appears in the above-identified patent and that said Letters Patent are hereby corrected as shown below:

Cover page, item [75], "Berkshire, Crawthorne", "Hampshire, Fleet" and "Surrey, Camberley" should read --Crawthorne, Berkshire--, --Fleet, Hampshire-- and --Camberley, Surrey--, respectively; after item [21] insert --[30] Foreign Application Priority Data January 15, 1971 Great Britain 2096/71--;

Signed and sealed this 19th day of February 1974.

(SEAL)
Attest:

EDWARD M. FLETCHER, JR.　　　　　C. MARSHALL DANN
Attesting Officer　　　　　　　　Commissioner of Patents